Nov. 24, 1925.
G. C. PACK
BRAKE BAND
Filed June 4, 1925
1,562,845
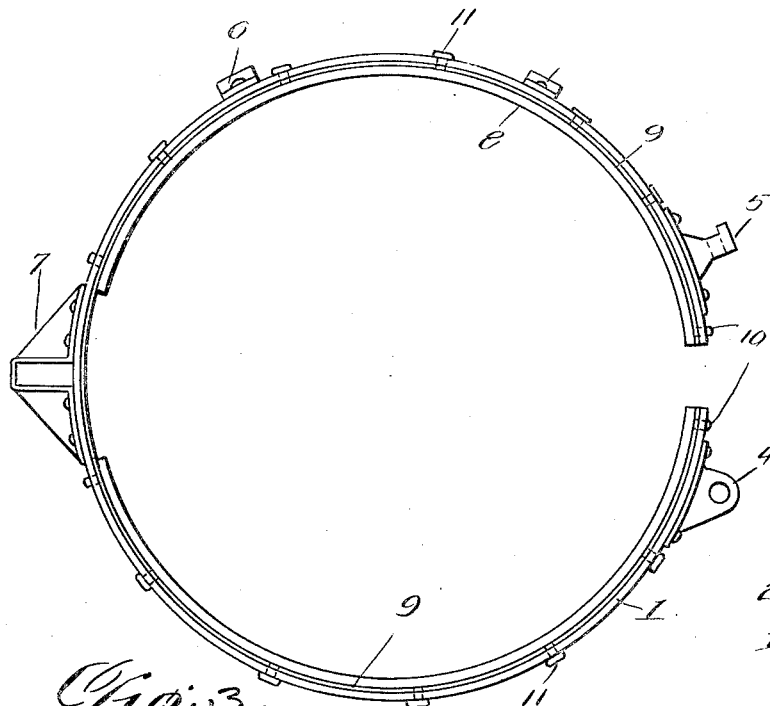
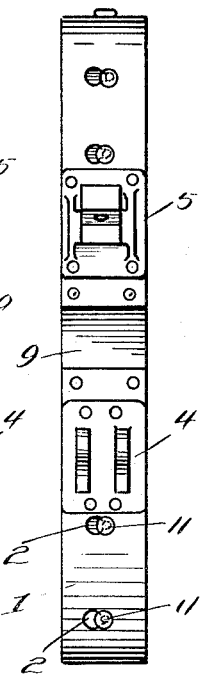
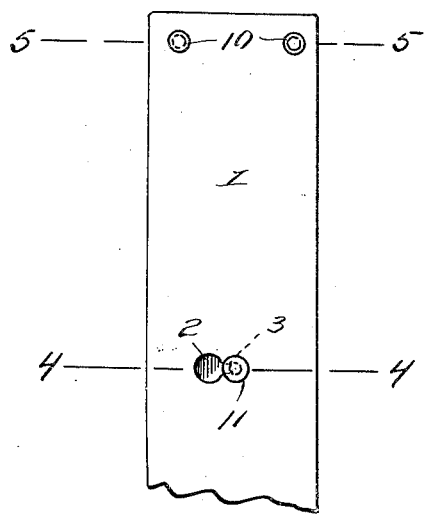
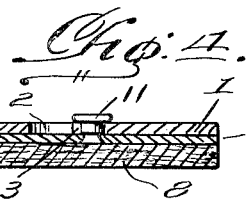
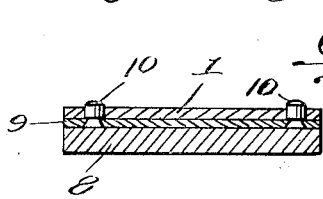
Inventor
G. Carl Pack, Patented Nov. 24, 1925.

1,562,845

UNITED STATES PATENT OFFICE.

GUSTAVE CARL PACK, OF NEW BRUNSWICK, NEW JERSEY.

BRAKE BAND.

Application filed June 4, 1925. Serial No. 34,875.

*To all whom it may concern:*

Be it known that I, GUSTAVE CARL PACK, a citizen of the United States, residing at 257 Sanford Street, in the city of New Brunswick, in the county of Middlesex and State of New Jersey, have invented certain new and useful Improvements in a Brake Band, of which the following is a specification.

The purpose of the present invention is to provide a detachable and renewable brake lining for use in association with automotive external brakes.

The usual automotive external brake comprises the metal band and lining, the lining being riveted fast to the inside of the band. When a new brake lining is necessary it involves the tedious process of removing the brake band from the machine, then literally tearing out the lining and removing the rivets that hold the lining to the band. If a new lining is to be put in, it is riveted anew to the band, and the complete assembly is again attached to the machine, this requiring services of a skilled mechanic.

The present improvement upon brake band resides, as above intimated, in the provision of one wherein the lining is readily renewable, making it an easy matter to replace a worn lining with ease and facility.

The structural details constituting what is believed to be the novelty of the present invention will be clearly set forth in the following description and specifically pointed out in the appended claim.

In the accompanying drawing forming a part of this application and in which like numerals designate like parts throughout the same:

Figure 1 is a side view of a brake band assembly constructed in accordance with the invention.

Figure 2 is a face view looking toward the spaced ends.

Figure 3 is an enlarged detail fragmentary view of one end of the band with the bracket removed.

Figures 4 and 5 are transverse sections taken approximately upon the planes of the lines 4—4 and 5—5 respectively of Figure 3.

Referring to the drawing in detail, the reference character 1 designates the usual brake band which, in accordance with the present invention, is modified by providing a multiplicity of circumferentially spaced holes 2 having restricted side notches 3. The holes together with the notches form what may be conveniently and collectively considered as key hole slots. In this connection I would direct attention to the fact that these slots are centrally positioned between the edges of the band 1, and that they extend transversely of the length of the band. In addition to these key hole slots the band 1 is provided at its free spaced ends with a pair of holes which serve a purpose to be hereinafter made clear. As is usual, the band 1 is equipped with the conventional brackets 4, 5, 6 and 7, the first two of which are disposed adjacent the free ends of the band, and the last named of which is arranged at a diametrically opposite point. The positions of these brackets however will vary according to the particular machinery upon which the brake is used.

The removable lining is designated by the reference character 8. As seen from Figure 1 it is preferably composed of two sections, the ends of which are spaced apart in the approximate degrees illustrated. This band is riveted to a resilient backing strip 9, preferably of spring steel. The spring steel strip is provided at its free ends with pairs of spaced lugs 10 extending through the correspondingly shaped holes in the band 1. Carried by the spring steel strip are headed studs 11 disposed in position to properly enter the key hole slots. In this connection I would point out that the heads of the studs are arranged with respect to the back strip 9 to properly accommodate the thickness of the band 1, thus maintaining the inner faces of the heads in firm contact with the outer surface of the band.

From the foregoing it will be obvious that I have evolved and produced a novel brake band which consists of a metal band upon which is fastened the brackets, necessary for operation, and into which is machined a hole, and slots to receive the headed studs and lugs of the reliner. The reliner comprises a strip of flat metal, preferably spring steel, bent to a radius greater than that of the brake band and carrying the headed stud and lugs for reception in the holes and slots respectively, this strip in turn having the fabric lining firmly riveted thereto.

Undoubtedly, a careful consideration of the detailed description in conjunction with the drawings will enable persons familiar with brake bands to obtain a clear understanding of the same. In this connection however, I would direct attention to the fact that the present structure is not in any way to be confused with what is known as the common transmission band. The stresses to which the two kinds of devices are subjected is entirely different. It is thought that a more lengthy description is unnecessary.

While I have shown and described the preferred embodiment of the invention, it is to be understood that minor changes in the size, shape and arrangement of parts may be resorted to without departing from the spirit of the invention or the scope of the appended claim.

Having thus described the invention, what I claim as new and desire to secure by Letters Patent is:—

In a structure of the class described, a brake band provided with a plurality of circumferentially spaced key-hole slots, said slots being disposed transversely of the longitudinal axis of the band, said band being provided adjacent its free end with spaced holes, a lining, and a resilient backing strip to which said lining is permanently fastened, said lining and strip being of a radius greater than that of said band, and said strip being equipped with lugs disposed in said holes and headed studs fitted into said key hole slots.

In testimony whereof I affix my signature.

GUSTAVE CARL PACK.